(12) United States Patent
Morgan et al.

(10) Patent No.: US 7,754,258 B2
(45) Date of Patent: *Jul. 13, 2010

(54) PORCINE COLLAGEN FILM

(75) Inventors: Trevor Morgan, Glasgow (GB); Derek Samuel David Norwood, Irvine (GB); Mark Gray, Coatbridge (GB)

(73) Assignee: Devro PLC, Glasgow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/542,115

(22) PCT Filed: Feb. 18, 2004

(86) PCT No.: PCT/GB2004/000661

§ 371 (c)(1),
(2), (4) Date: Nov. 14, 2005

(87) PCT Pub. No.: WO2004/073407

PCT Pub. Date: Sep. 2, 2004

(65) Prior Publication Data

US 2006/0236891 A1    Oct. 26, 2006

(30) Foreign Application Priority Data

Feb. 21, 2003    (GB) ................... 0303999.7

(51) Int. Cl.
*A22C 13/00*    (2006.01)
*A23J 1/00*    (2006.01)
*A23J 1/10*    (2006.01)

(52) U.S. Cl. .............. 426/135; 426/437; 426/656; 426/657; 8/94.15

(58) Field of Classification Search .......... 426/135, 426/268; 8/94.16
See application file for complete search history.

(56) References Cited

U.S. PATENT DOCUMENTS

| 4,196,223 A | 4/1980 | Shank |
| 4,222,741 A | 9/1980 | Whitney et al. |
| 6,482,240 B1 | 11/2002 | Geistlich et al. |
| 2005/0031741 A1* | 2/2005 | Morgan et al. .............. 426/135 |

FOREIGN PATENT DOCUMENTS

| ES | 2 017 564 | 2/1991 |
| WO | WO 03/017770 A | 3/2003 |

OTHER PUBLICATIONS

Merriam-Webster reference sheet (1 page).*
International Preliminary Report on Patentability and Written Opinion of Searching Authority corresponding to PCT/GB2004/000661 mailed Aug. 26, 2005.
International Search Report corresponding to PCT/GB04/000661 mailed on May 28, 2004.

* cited by examiner

*Primary Examiner*—David J Steadman
*Assistant Examiner*—Marsha M Tsay
(74) *Attorney, Agent, or Firm*—Myers Bigel Sibley & Sajovec P.A.

(57) ABSTRACT

A porcine collagen film is made from an extrudable collagen gel. The porcine collagen is essentially sow collagen. The ratio of collagen to fat is usually above 10:1, for example in the range 25:1 to 50:1.

17 Claims, 9 Drawing Sheets

Ex 1a @ 1500 magnification

Fig.6

Ex 1b @ 1500 magnification

Fig.7

Ex 2a @ 1500 magnification

Fig.8

Ex 2b @ 1500 magnification

Fig.9

Geistlich 1 @ 1500 magnification

Fig.10

Geistlich 2 @ 1500 magnification

Fig.11

PORCINE COLLAGEN FILM

RELATED APPLICATIONS

This application claims priority under 35 U.S.C. §371 from PCT Application No. PCT/GB04/000661, filed in English on Feb. 18, 2004, which claims the benefit of Great Britain Application Serial No. 0303999.7 filed on Feb. 21, 2003, the disclosures and contents of which are incorporated by reference herein in their entireties.

The present invention relates to the use of porcine collagen derived from pigs, generally pig skin (also known as pig hide), for the production of a collagen film having improved properties. In particular, the collagen is derived from sows.

Artificial collagen films made from reconstituted collagen derived from natural animal sources have been commercially available for many years. These collagen films are typically used for wrapping food products, such as hams etc. At present, the principal source of animal collagen is bovine collagen derived from the hides of cattle. After the cattle have been slaughtered, the hides are removed and the underlayer composed principally of collagen is split away. The bovine collagen is then mechanically comminuted and formed into a gel in known manner. The gel is extruded to form a film. The film is then cured, typically by change of pH and/or the use of cross-linking agents such as glutaraldehyde.

Collagen is also potentially available from a number of other sources, such as pigs, sheep, goats, avian, fish etc., but none of these have found widespread commercial use up to the present time. In particular, artificial collagen films and casings made from these sources, particularly porcine collagen, appear to have a number of disadvantages, particularly in having relatively low tensile strengths. Nonetheless, a porcine collagen film is currently available from Ed. Geistlich Sons Ltd., under the trade name Bio-Foil and is intended for wrapping hams.

It is, however, an object of the present invention to provide a porcine collagen film having improved properties.

In the prior art, attempts have been made to employ porcine-derived collagen, particularly collagen derived from pig intestines. Often, mixtures with bovine collagen are employed. Thus, U.S. Pat. No. 4,407,829, Sjolander discloses the use of pig intestines, pig lungs or cow rumen to produce a collagen slurry in a manner involving the use of proteolytic enzymes. U.S. Pat. No. 5,411,887 Sjolander discloses the production of a collagen film through the enzyme treatment of pig intestines. U.S. Pat. No. 5,840,849 Loders Croklaan discloses the use of a mixture of bovine collagen and pig intestine collagen treated with proteolytic enzymes for the production of paste for co-extruded sausage casings.

Patent U.S. Pat. No. 5,229,497 Teepak discloses the use of impure connective tissue derived from a variety of animal sources, including cattle, poultry, swine and sheep, for the production of collagen casings. Skin and bone are excluded. The process involves the use of up to three enzyme treatment stages and the removal of fat from the connective tissue can be accomplished by a number of possible options. The only practical example disclosed involves the use of desinewed beef shanks.

There are also a number of prior art documents which involve the use of collagen derived from pig skins or hides. Patent U.S. Pat. No. 4,196,223 Wilson Foods discloses the production of a collagen gel from pig skins and its subsequent coagulation and tanning to produce a collagen casing. However, the casing produced is said not to have adequate strength for use in commercial stuffing equipment (see U.S. Pat. No. 4,615,889). Patent U.S. Pat. No. 4,615,889 Devro discloses the use of a mixture of bovine collagen and collagen derived from pork skin for the production of a collagen casing. Patent GB915441 Armour gives an example of the use of pig skins for the production of a collagen film.

The production of collagen films or casings by processes involving proteolytic enzymes are complex and consequently costly and may not have achieved commercial use for that reason. In some instances, mixtures of bovine and porcine collagen have been used, presumably in order to achieve the necessary strength. In our experience, the production of collagen films or casings from purely porcine collagen leads to a product of poor tensile strength.

It is an object of the present invention to mitigate these problems and allow for the production of an essentially porcine collagen film.

The present invention is based on the discovery that the use of collagen derived from sow skins gives particular benefits.

Thus, one aspect of the present invention provides an extruded porcine collagen film made from an extrudable collagen gel; the collagen content of the film consisting essentially of sow collagen.

It has been found that the use of sow collagen imparts strength to the collagen film. In particular the collagen is present in the film substantially in the form of fibres. For this reason mechanical defatting of fibres (rather than chemical or enzymic processes) are preferred for preparing the extrudable gel. The fact that the collagen in the gel and in the finished film is derived from sows can be determined by Isothermal Shrink Tension (IST) measurements as described herein.

It is to be understood that typically the ratio of collagen to fat in natural pig hides or skins is in the region 1:1 to 1.5:1. The present invention preferably uses such sow skins or sow hides as the porcine collagen source. Preferably, the ratio of collagen to fat is at least 2.5 to 1.

The structural characteristics of pig skins are well known and are discussed for example in World Leather, October, 1997, page 85-90. Thus, pig skin is known to comprise from outside to inside an epidermis layer, dermis layer and subcutaneous fatty layer. The dermis layer is relatively thick compared to the epidermis and is the principal location of collagen fibres. The big bristles are also located in the dermis layer and "cones" of fat tend to extend upwardly from the subcutaneous fatty layer through the dermis layer at the base of each bristle follicle. Thus, there tends to be a division between the collagen-containing dermis layer and the subcutaneous fatty layer. This division is less pronounced in younger pigs and more pronounced in older pigs.

There are a number of ways of increasing the ratio of collagen to fat in pig skins. One of the most effective ways is to carefully control the mechanical treatment of the pig skins in the tannery. The fresh pig skins can be subjected to mechanical defleshing which removes the subcutaneous fatty layer and some of the dermis layer to an extent that the ratio of collagen to fat is in the required ratio. Fat may also be chemically removed by treatment with alkali, such as sodium hydroxide. Smaller amounts of fat may also be removed at other stages during the preparation of the extrudable gel. Other options include removal of fat by solvent extraction (using acceptable food agents such as liquid carbon dioxide). Enzyme treatments are optional but not preferred since they appear to reduce the fibrous nature of the collagen.

In another aspect of the invention, the percentage of fat in the porcine collagen film is reduced to a level below 20%, particularly below 18% and especially below 16% by weight on a dry weight basis.

The ratio of collagen to fat is at least 2.5:1, preferably at least 3, particularly at least 3.5 and especially at least 4:1.

Higher ratios of collagen to fat above 10:1, and even above 20:1 may be achieved. Preferably, the ratio is above 30:1 and especially above 40:1. However, the fat content is preferably controlled to achieve a good overall balance of properties in the final collagen film. Preferred ranges include 25:1 to 50:1, particularly 30:1 to 45:1. Thus, a certain proportion of fat in the final film improves the appearance of the film, giving it an attractive sheen, and where the film is to be used around cooked products, tends to improve the cooking properties of the film. The unsaturated nature of the pig fat may provide unexpected strength (eg. via cross-linking). Thus, the amounts of other additives, such as glycerol or other humectants, included in the product may depend to an extent on the proportion of fat.

The object of the present invention is the provision of a collagen product essentially from porcine sources. The inclusion of bovine collagen is not preferred but minor amounts, preferably less than 10% and particularly less than 5%, of collagens derived from sheep, poultry, birds, fish etc., may optionally be included.

The collagen properties can be varied by mixing collagen derived from, young pigs (about 4 months old) and sows (female pigs about 1 year old or more) in ratios of 0:100 to 10:90 (particularly 5:95). Older sow material tends to increase strength.

Apart from the required defatting, the porcine collagen may be processed in conventional manner to produce an extrudable aqueous gel. Generally, the porcine raw material is defatted and then disintegrated firstly in a mincing machine and secondly in a mill (e.g. a plate mill) to produce a fibrous paste. Fat may be mechanically removed from the fibrous paste. The paste is then acidified with a strong mineral acid such as hydrochloric acid or with an organic acid such as lactic acid to swell the collagen. Alternatively, an alkaline swollen gel could be produced according to known techniques. Usually the gel comprises 94-96% water and 4-6% (typically about 5%) of collagen and other constituents by weight.

It is optional to include an alginate ester, such as an alginate glycol e.g. ethylene glycol alginate or propylene glycol alginate in the extrudable gel. This has been found to improve the strength, particularly the wet strength, of the film. Thus, improvements are found in the Burst Height Retention value and also in the Machine Direction (MD) wet tear strength. Generally, the alginate ester is present in the gel in up to 1% by weight, preferably up to 0.5% by weight (corresponding typically to up to 20%, preferably up to 10% by weight in the film). In the gel and the film the ratio of collagen to alginate ester is generally in the range 95:5 to 75:25 by weight.

Other additives including humectants such as glycerol and sorbitol together with other desired known additives (e.g. flavours, colours and spices) may be included. The humectant is preferably present in the film in an amount of 10 to 45%, preferably 15 to 40% (e.g. 15-45%; or 10-40%) on a dry weight basis and may comprise glycerol, sorbitol or mixtures thereof. Cellulose may be included to modify the shrink tension of the film. The gel may also include coagulating agents such as minor amounts of glutaraldehyde, glyoxal, liquid smoke or multivalent cation (such as aluminium) which are effective to cross-link the collagen film and thereby increase its strength. Aluminium ions also waterproof the film. This increase in strength may, however, be at the expense of reduced elasticity. The gel is then homogenised, filtered and allowed to stand prior to extrusion.

Generally, the collagen solids content of the gel on a weight basis is in the range 2 to 10%; preferably 2.5 to 7%. The collagen solids content of the film is usually in the range 50 to 70% (typically 60%) by weight.

Extrusion is generally carried out through a slot extruder and the extruded material is generally applied onto a support belt to a wet thickness in the range 0.2 to 5 mm. The extruded film may be further treated with a liquid coagulating agent such as a salt bath (for example, sodium chloride or ammonium sulphate solution), an alkali bath (for example sodium carbonate) or a glutaraldehyde solution to coagulate the film. Coagulation may also be achieved using gaseous alkali such as ammonia gas. These treatments may be applied before or after drying the film.

Of course, the film could be further processed into other products. For example, it could be slit and twisted to form an edible string in known manner. The string could be used to form netting. The string and netting may be used, for example, for trussing pork roast, shoulder, belly or hams.

The porcine collagen films of the present invention have been found to have a wet tear strength in the extrusion direction (MD) greater than 300 gf/mm, particularly greater than 400 gf/mm and often greater than 500 gf/mm by the test methods disclosed herein.

The porcine collagen film has good strength, particularly in the dry state, and may be used for wrapping moist food product, such as pieces of pork or other meat. It is particularly useful for the production of shaped cooked hams from pork shoulder pieces. The porcine collagen film exhibits good strength, good cooking abilities, good appearance and film integrity. Thus, further aspects of the present invention include a process of producing the porcine collagen film, as well as a food product (especially a pork product) wrapped with the porcine collagen film or coated with the collagen gel and cured to form a film.

Embodiments of the present invention will now be described by way of example only.

BACKGROUND

Commercially available (Ed. Geistlich Sons Ltd.) porcine collagen film (Geistlich 1 and 2) have been analysed and found to contain the following on a dry weight basis:

|  | Geistlich 1 | Geistlich 2 |
| --- | --- | --- |
| Collagen | 48.7% | 68.8% |
| Glycerol | 19.7% | 20.6% |
| Fat | 30.6% | 12.4% |
| Ash | 0.7% | 0.4% |
| Collagen:Fat Ratio | 1.6:1 | 5.5:1 |

Throughout these examples, the weight percentages will approximate 100% but within the limits of experimental error.

Defatting

The raw material is normally received as a salted pig (sow) skin (hide).

A typical defatting process would involve some or all of the following steps:

1. Initial Soak—Add the skins to the processing drum and add between 150% to 200% equivalent weight of fresh clean water at 28 deg C. Rotate for up to 1 hour and drain the vessel.
2. Main Soak—Add water (28 to 32 deg C.) equivalent to 100% to 200% weight of raw hides. Add up to 0.5% of sodium carbonate or the like (helps to rehydrate through elevating the pH) and up to 0.2% by weight of wetting agent such as Danol WA (helps rehydration and removal of surface fats).

3. Fat removal—Remove hides from the vessel. Feed the whole hide pieces into a proprietary fleshing machine such as those made by Poletto, Rizzi, Mosconi & Persico. Set the cutter height to an appropriate position to effect good visual fat reduction without unduly removing good collagen. Fat removal can also be done prior to the soaking stages using a suitable proprietary fleshing machine. Hides prepared in such a manner are usually shipped in a salted condition but can also be frozen without use of salt. Material prepared in such a fashion can proceed to unhairing straight away after completing the initial soaking stages.

4. Unhair-Reweigh material into vessel. Add water (about 25 deg C.) at up to 200% equivalent weight of hides. Add up to 3.5% by weight of sodium sulfide or up to 5% by weight of sodium hydrosulfide, and a wetting agent at up to 0.2% by weight. A strong alkali is usually added, such as sodium hydroxide or lime to maintain the pH at 11 to 12 for the duration of the processing time. A liming auxiliary such as Erhavit MC or Aglutan PR at up to 0.3% by weight is usually added also. Typical processing times are between 12 hours and 60 hours before the liquor is drained.

5. Wash 1—Add fresh clean water (200% equivalent weight) along with a wetting agent (typically 0.2%) and rotate for 30 minutes then drain.

6. Wash 2—Add fresh clean water (200% equivalent weight) and rotate for up to 30 minutes then drain. This stage can be repeated up to 4 times to remove residual surfactant (until no evidence of foam in the vessel).

7. Decalcification—Remove excess calcium ions (only where lime was previously used) with ammonium sulphate solution to a pH of around 9.

8. Buffer—Reduce pH of hides to around 2.5 to 6 with a solution of citric acid and sodium citrate, or hydrochloric acid.

9. Final washes—Wash hides with batches of fresh clean water to remove dissolved salts to a level where the drained liquor conductivity falls below 200 μmhos.

EXAMPLES 1a & 1b a) Salted sow skins were prepared by rehydrating, washing, unhairing & mechanically defatting using a method described above.
b) The resultant skin had a collagen:fat ratio of 44:1
c) The skins were then further washed, decalcified and buffered to a pH of around 4.5 and then washed again to reduce the level of dissolved salts.
d) These skins were next disintegrated; firstly with a mincing machine and then a plate mill to produce a fibrous paste.
e) This paste was blended together with a mixture of glycerol, sorbitol, hydrochloric acid, aluminium sulphate and glutaraldehyde to form a swollen aqueous paste of constituents by weight (the balance being water);

| | |
|---|---|
| HCl | 0.12% |
| Collagen | 3.03% |
| Fat | 0.07% |
| Glycerol | 1.16% |
| Sorbitol | 0.29% |
| Aluminium ion | 0.0106% |
| Glutaraldehyde | 0.0012% |
| (Total | 4.68% - balance water) | f) This paste was homogenised through a dairy homogeniser to produce a cohesive, smooth swollen gel.
g) This gel was extruded, through a slot extruder, to a wet thickness approximately 0.5 mm, onto a continuous support belt and dried at a temperature around 60° C.
h) The resultant dried film was wound using a proprietary winding machine.
i) The film was further processed by treating with ammonia gas until the pH was increased to above 5 (Ex 1a in the Table).
j) A further embodiment of the above film was manufactured from the same gel and extruder but treated with gaseous ammonia prior to drying and reeling (Ex 1b in the Table).

EXAMPLES 2a & 2b

PGA Included a) Salted sow skins were prepared by rehydrating, washing, unhairing & mechanically defatting using a method described above.
b) The resultant skin had a collagen:fat ratio of 44:1
c) The skins were then further washed, decalcified and buffered to a pH of around 4.5 and then washed again to reduce the level of dissolved salts.
d) These skins were next disintegrated; firstly with a mincing machine and then a plate mill to produce a fibrous paste.
e) This paste was blended together with a mixture of glycerol, sorbitol, hydrochloric acid, aluminium sulphate, glutaraldehyde and propylene glycol alginate (PGA) to form a swollen aqueous paste of constituents by weight (the balance being water);

| | |
|---|---|
| HCl | 0.12% |
| Collagen | 3.03% |
| Fat | 0.07% |
| Glycerol | 1.16% |
| Sorbitol | 0.29% |
| PGA | 0.3% |
| Aluminium ion | 0.0106% |
| Glutaraldehyde | 0.0012% |
| (Total | 4.98% - balance water) | f) This paste was homogenised through a dairy homogeniser to produce a cohesive, smooth swollen gel.
g) This gel was extruded, through a slot extruder, to a wet thickness approximately 0.5 mm, onto a continuous support belt and dried at a temperature around 60° C.
h) The resultant dried film was wound using a proprietary winding machine.
i) The film was further processed by treating with ammonia gas until the pH was increased to above 5 (Ex 2a in the Table).
j) A further embodiment of the above film was manufactured from the same gel and extruder but treated with gaseous ammonia prior to drying and reeling (Ex 2b in the Table).

EXAMPLE 3

PGA and Higher Fat a) Salted sow skins were prepared by rehydrating, washing, unhairing and mechanically defatting using a method described above.
b) The resultant skin had a collagen: fat ratio of 10.0 to 1.

c) The skins were then further washed, decalcified and buffered to a pH of around 4.5 and then washed again to reduce the level of dissolved salts.
d) These skins were next disintegrated; firstly with a mincing machine and then a plate mill to produce a fibrous paste.
e) This paste was blended together with a mixture of glycerol, sorbitol, hydrochloric acid, aluminium sulphate, glutaraldehyde and propylene glycol alginate (PGA) to form a swollen aqueous paste of constituents by weight (the balance being water);

| | |
|---|---|
| HCl | 0.12% |
| Collagen | 3.03% |
| Fat | 0.3% |
| Glycerol | 1.16% |
| Sorbitol | 0.29% |
| PGA | 0.3% |
| Aluminium ion | 0.0106% |
| Glutaraldehyde | 0.0012% |
| (Total | 5.21% - balance water) | f) This paste was homogenised through a dairy homogeniser to produce a cohesive, smooth swollen gel.
g) This gel was extruded, through a slot extruder, to a wet thickness approximately 0.5 mm, onto a continuous support belt.
h) The extruded film was further processed by treating with ammonia gas until the pH was increased to above 5 and dried at a temperature around 60° C.
i) The resultant dried film was wound using a proprietary winding machine.

The properties of the film were as follows (as determined by the Test Methods a) to c) described herein):

| | |
|---|---|
| Weight | 39 g/m$^2$ |
| pH | 5.2 |
| Burst Height | 81.1 cm |

The qualitative attributes as determined by commercial customer feedback (following a steam/smoke ham production process) were that the stuffing/clipping and cooking properties and the film appearance and integrity were all comparable to a typical bovine collagen film.

Test Methods

The following test methods were used to obtain the data in the Table.

a) Weight
1. 1 meter of film is cut to length.
2. Film is weighed
3. Film width is measured
4. Weight per square meter is calculated b) pH
1. A 5g sample of film is weighed into a mixing vessel.
2. 100 ml of distilled water at room temperature is added.
3. Film and water are blended together with a suitable high sheer mixer.
4. pH is measured with a suitable instrument after initially calibrating.

c) Burst Height
1. Film is sampled at various positions across its width.
2. Each individual sample is clamped at the base of a perspex column of diameter 50.8 mm 3. Water is introduced at a constant flow rate of 1.5 L/minute to the top of the column
4. The height of water held before rupture is recorded
5. 15 samples (5 edge 1, 5 middle, 5 edge 2) are tested for each film type and the average is noted d) Pierced Burst Height
1. Test is conducted in same manner as burst height except that each film sample is pre-punctured by a 2-pin device with pins of 1.4 mm diameter spaced 15 mm apart. The punctures are located near to the centre of the test area.

e) Burst Height Retention
1. A calculated value determined by dividing the average pierced burst height by the average burst height.

f) Wet Tear Test (both Md & Td Directions)
1. Film samples are cut across the web to a size 9 cm×9 cm.
2. A 4.5 cm cut is made in the film in either the machine or transverse direction from the middle of an edge to the centre.

3. Machine and transverse directions are tested separately
4. The uncut portion of the samples are immersed in iced water for 30 seconds
5. The cut pieces are clamped in an Instron 5544 tensometer using the upper and lower jaw sets
6. Samples are pulled apart at a speed of 5 cm/minute for a total distance of 4 cm
7. Energy to tear is recorded g) Colour
1. A proprietary colourmeter is calibrated using a suitable white reference tile.
2. 5 Test specimens of film are placed in turn on the reference tile and the colour is measured
3. The average L, a & b value is recorded.

h) 2D Tear Test Both Md and Td Directions
1. Samples of film are cut to dimensions 19 cm×19 cm
2. They are next conditioned at 65% relative humidity and 20° C. for 24 hours.
3. Samples are stretched biaxially at a speed of 1 cm/minute until break point.
4. The stress at break values are recorded
5. From the same tests the secant modulus at 2% stretch is calculated. (This indicates the elasticity of the sample at the very start of the test)

i) Film Odour
1. A test panel of people were asked to describe the odour and score it as Good, Fair or Poor.

j) Appearance
1. Visual colour/appearance of reeled film.

k) Thickness
Is measured with a proprietary thin film thickness measurement device e.g. an Elco meter.

Isothermal Shrink Tension (IST) Determination

It is well understood that Mammalian collagen, in contact with water, contracts sharply at temperatures from 60° C.-70° C. to about 25% to 33% of its initial length. If the shrinkage is inhibited, by rigidly mounting the sample, then considerable tension will develop. IST testing studies the thermal shrinkage of collagen by measuring the tension generated with constant rate beating.

The apparatus essentially consists of:
a) A pair of opposing jaws across which a test sample can be mounted, one set of jaws is directly connected to a strain gauge.
b) The sets of jaws are themselves mounted on a rigid reinforced frame.
c) Within a single frame a plurality of jaw sets can be attached. Most usually circumferentially and equidistantly.
d) A tank for immersing the whole frame and filled with a heating fluid, usually water.
e) A heater facility for the immersion tank to raise the temperature of the fluid.
f) A device for recording the tension generated over the time period of the test
g) A device for charting the output from the individual strain gauges.

A) Raw Material IST

The method consists of:
1) Stamping 5 test pieces of equal dimensions from the middle of the hide close to the spine, in the direction of the spine and with no visible fat present.
2) Checking the weight of every sample and then mounting them in each jaw set on the apparatus and taking care to securely fasten whilst also minimising residual tension.
3) Immersing the apparatus in the water bath and ensuring that all the test samples are fully immersed for the duration of the test.
4) Pre-heating the water in the bath to 40° C.
5) Setting all strain gauges to zero.
6) Commencing recording of tension generated from each jaw set.
7) Raising the temperature of the water bath at 1° C. per minute up to 90° C.
8) On completion of the test an equivalent untested sample set is analysed for collagen content.
9) The final tension data is averaged for the 5 samples and normalised back to the dry weight of material and then charted against temperature.
10) It is more usual to normalise the tension data back to dry collagen content derived from the material analysis.
11) For the examples disclosed the samples were stamped from buffered and washed hides, immediately prior to mincing and disintegration. IST testing can also be conducted on materials at other suitable stages of the process.

B) Film IST

The method consists of:
1) Stamping test pieces of equal dimensions across the full width of the film sample and in both the extrusion direction (Md) and the transverse direction (Td).
2) Each test comprises loading 32 test pieces into each jaw set and following the procedure set out above for the raw material tests.
3) After conducting the test, the tension data is averaged over the total number of individual tests.
4) Where the collagen content of the film samples are significantly different the data is normalised back to dry collagen content before charting against temperature.

TABLE 1

| Test | Ex 1a | Ex 1b | Ex 2a | Ex 2b | Geistlich 1 Commercial Porcine Film | Geistlich 2 Commercial Porcine Film |
|---|---|---|---|---|---|---|
| Weight[a] | 31 g/m² | 31 g/m² | 40 g/m² | 40 g/m² | 38 g/m² | 35.5 g/m² |
| pH[b] | 7.5 | 5.0 | 5.0 | 5.2 | 3.9 | 7.18 |
| Burst Height[c] | 47.1 cm | 44.1 cm | 58.7 cm | 57.3 cm | 66.6 cm | 69.4 cm |
| Pierced Burst Height[d] | 41.0 cm | 44.1 cm | 47.6 cm | 57.3 cm | 40.1 cm | 53.0 cm |
| Burst height retention[e] | 87.0% | 100% | 81.1% | 100% | 60.2% | 76.4% |
| Wet MD tear test (total energy)[f] | 416 gf/mm | 386 gf/mm | 505 gf/mm | 599 gf/mm | 205 gf/mm | 280 gf/mm |
| Wet TD tear test (total energy) | 324 gf/mm | 401 gf/mm | 322 gf/mm | 391 gf/mm | 210 gf/mm | 323 gf/mm |
| Colour (L, a, b)[g] | 97.05 / −0.34 / 3.50 | 97.17 / −0.17 / 2.92 | 96.78 / −0.17 / 3.14 | 97.05 / −0.30 / 3.68 | 96.49 / −1.24 / 7.72 | 97.04 / −0.81 / 6.13 |
| 2 D tear test Md stress at break (MPa)[h] | 9.95 ± 0.65 | 9.80 ± 1.27 | 11.37 ± 0.22 | 13.98 ± 0.66 | 9.56 ± 3.95 | XXXX |
| 2 D tear test Td stress at break (MPa)[h] | 9.66 ± 0.80 | 9.08 ± 1.38 | 10.44 ± 0.76 | 13.34 ± 0.86 | 7.77 ± 2.87 | XXXX |
| 2 D tear test Md 2% secant modulus (Mpa)[h] | 104.87 ± 17 | 109.33 ± 22 | 183.83 ± 7 | 100.67 ± 24 | 119 ± 20 | XXXX |
| 2 D tear test Td 2% secant modulus (MPa)[h] | 139.06 ± 21 | 131.83 ± 27 | 198.50 ± 7 | 140.50 ± 39 | 164.25 ± 36 | XXXX |
| Film odour[i] | Fair | Good | Fair | Good | Poor | Poor |
| Appearance[j] | Pale straw | Pale straw | Pale straw | Pale straw | Straw | Straw |
| Thickness [k] (0.001") | 0.87 | 0.86 | 1.24 | 1.24 | 1.04 | 1.01 |

Geistlich 1 and 2 are two samples of prior art film sold by Ed. Geistlich Sons Ltd. for comparison.

Figure 1:
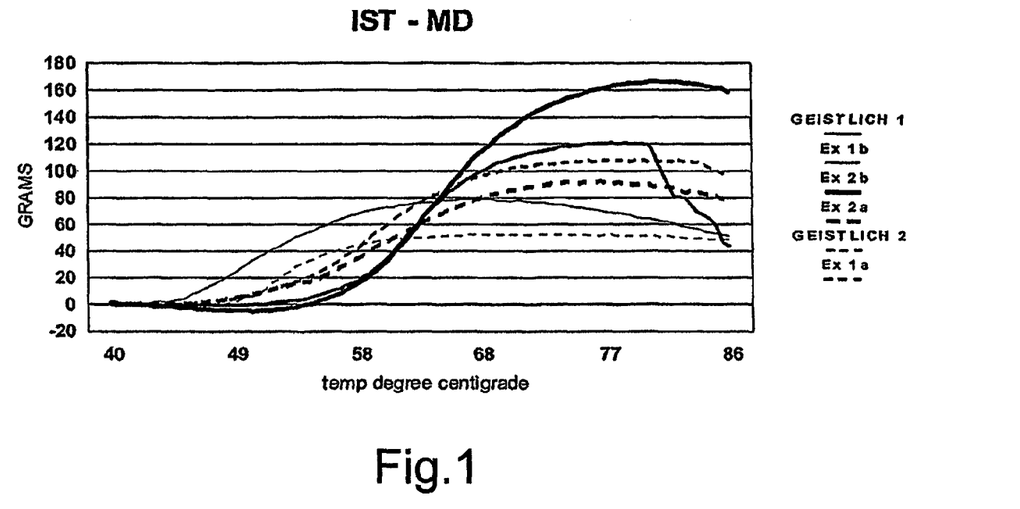
FIGS. 1 and 2 show IST values in the machine extrusion direction (MD) and the transverse direction (TD) for the Devro films of Examples 1a, 1b, 2a and 2b (invention) and Geistlich 1 and 2 commercial porcine films for comparison.
Figure 2:
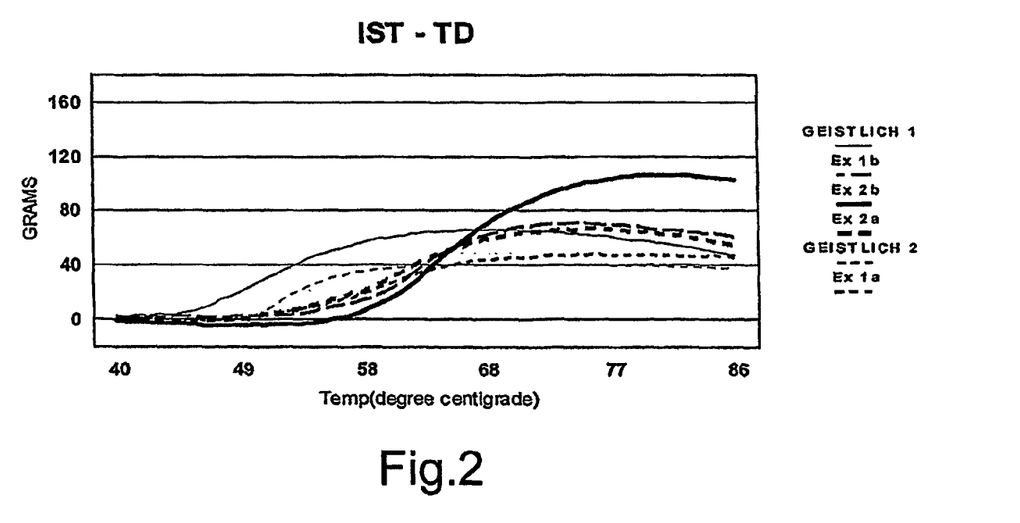
Figure 3:
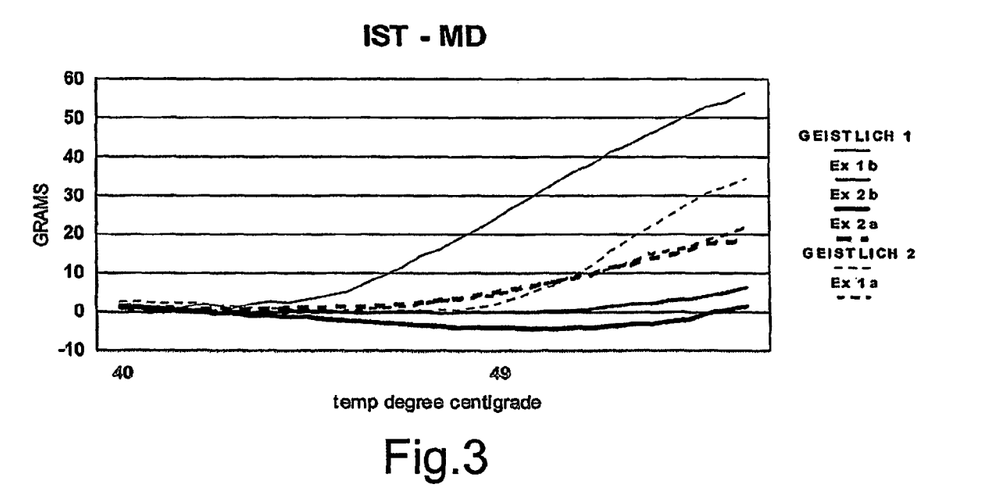
FIGS. 3 and 4 show details thereof which illustrate more clearly the onset of shrinkage temperatures.
Figure 4:
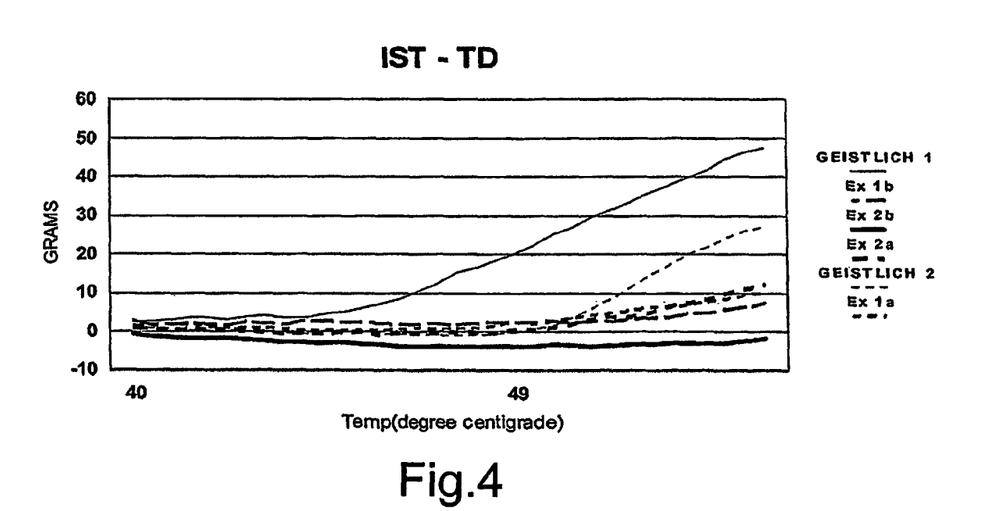
Figure 5:
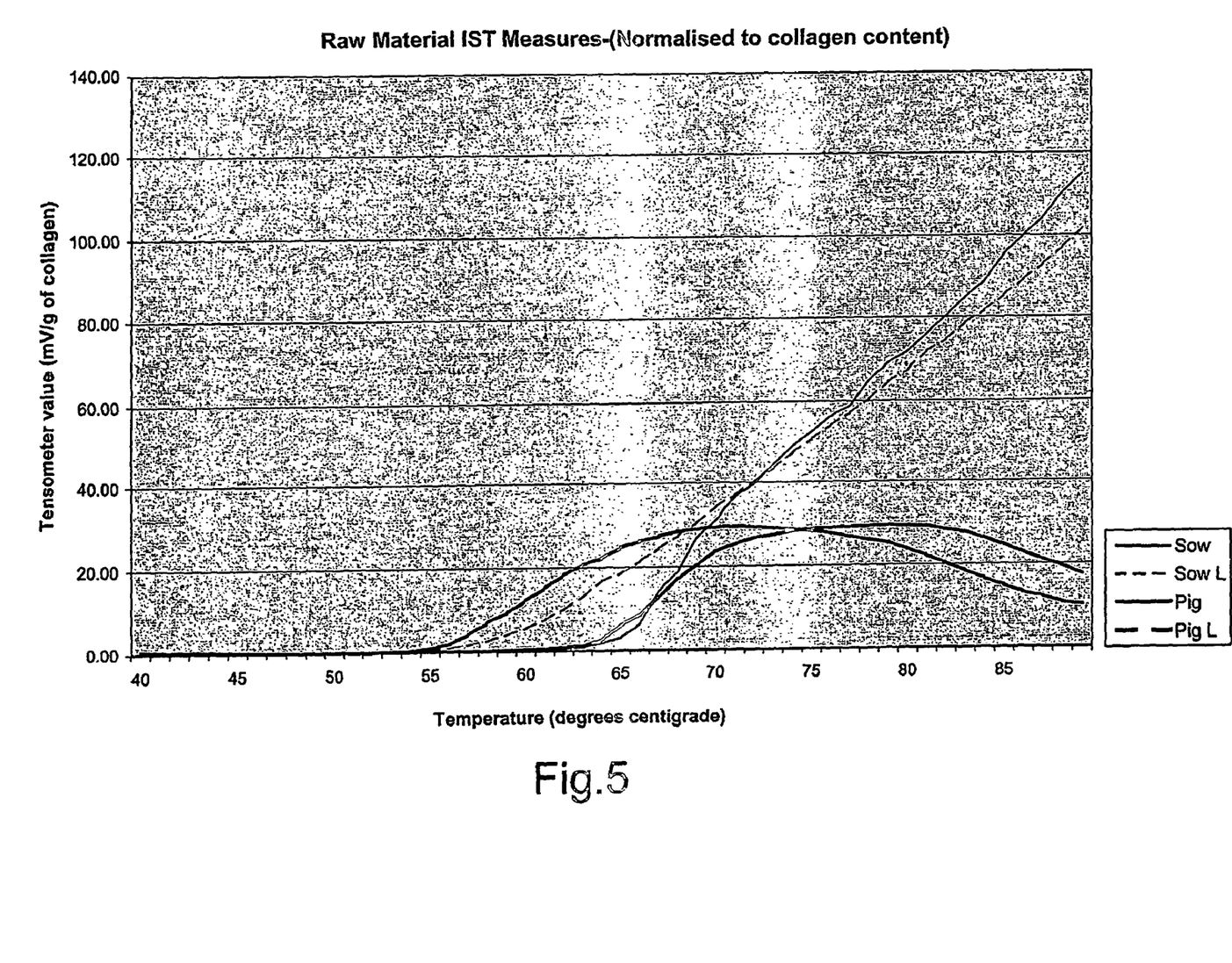
FIG. 5 show IST values for the raw and limed sow collagen material in comparison with raw and limed pig collagen.
Figure 6:
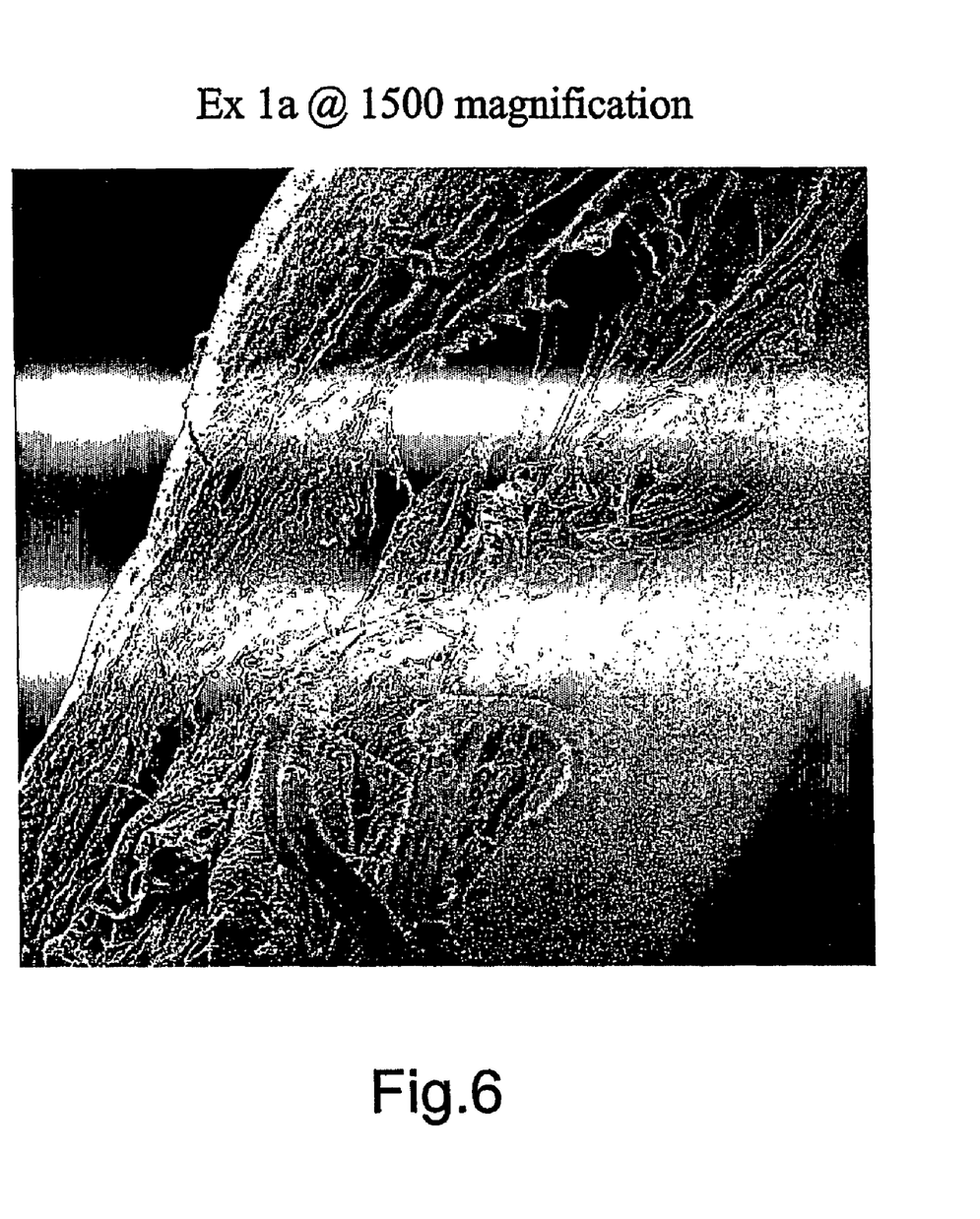
FIGS. 6 to 11 are scanning electromicrographs (SEM's) of the products of Examples 1a, 1b, 2a, 2b and Geistlich (comparison) showing the fibrous nature of the films of the invention.
Figure 7:
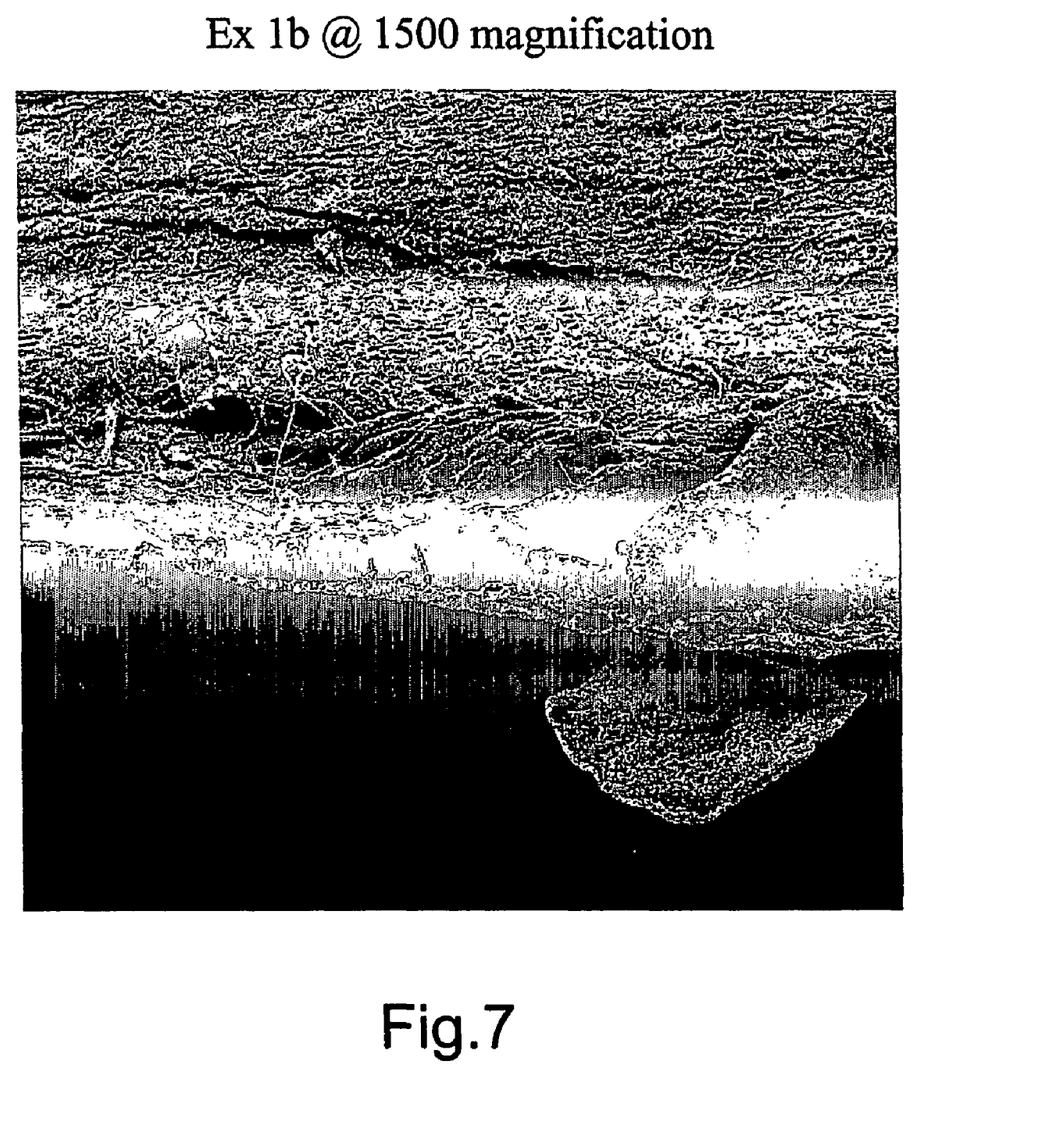
Figure 8:
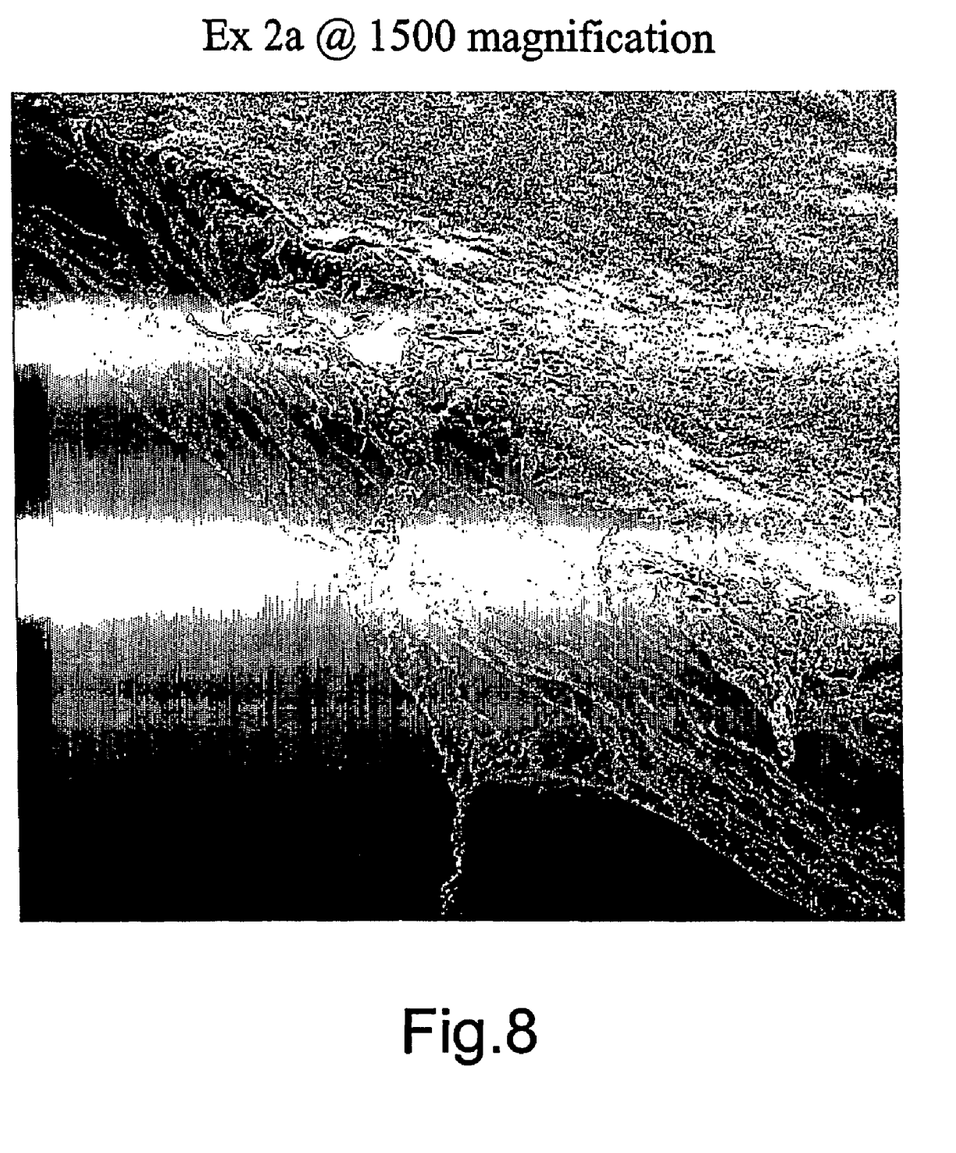
Figure 9:
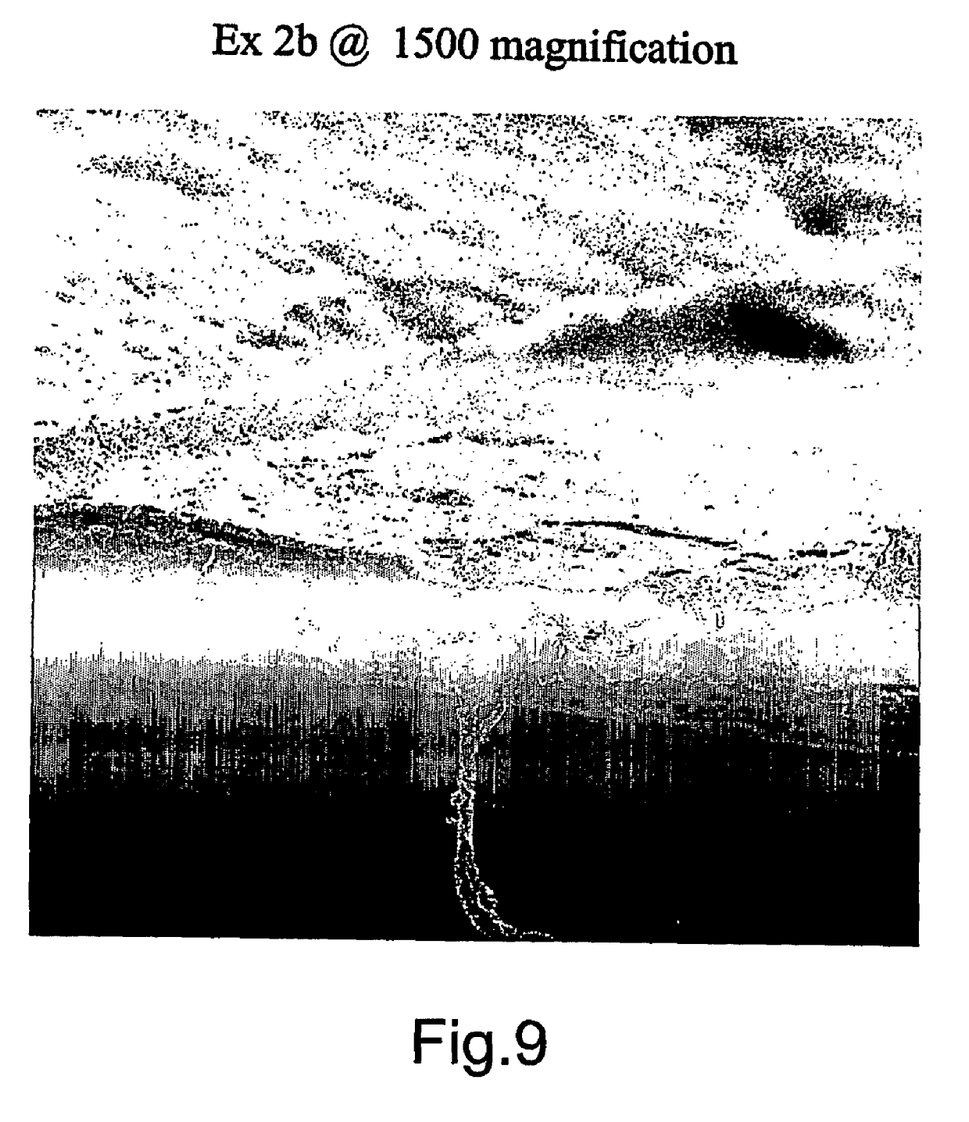
Figure 10:
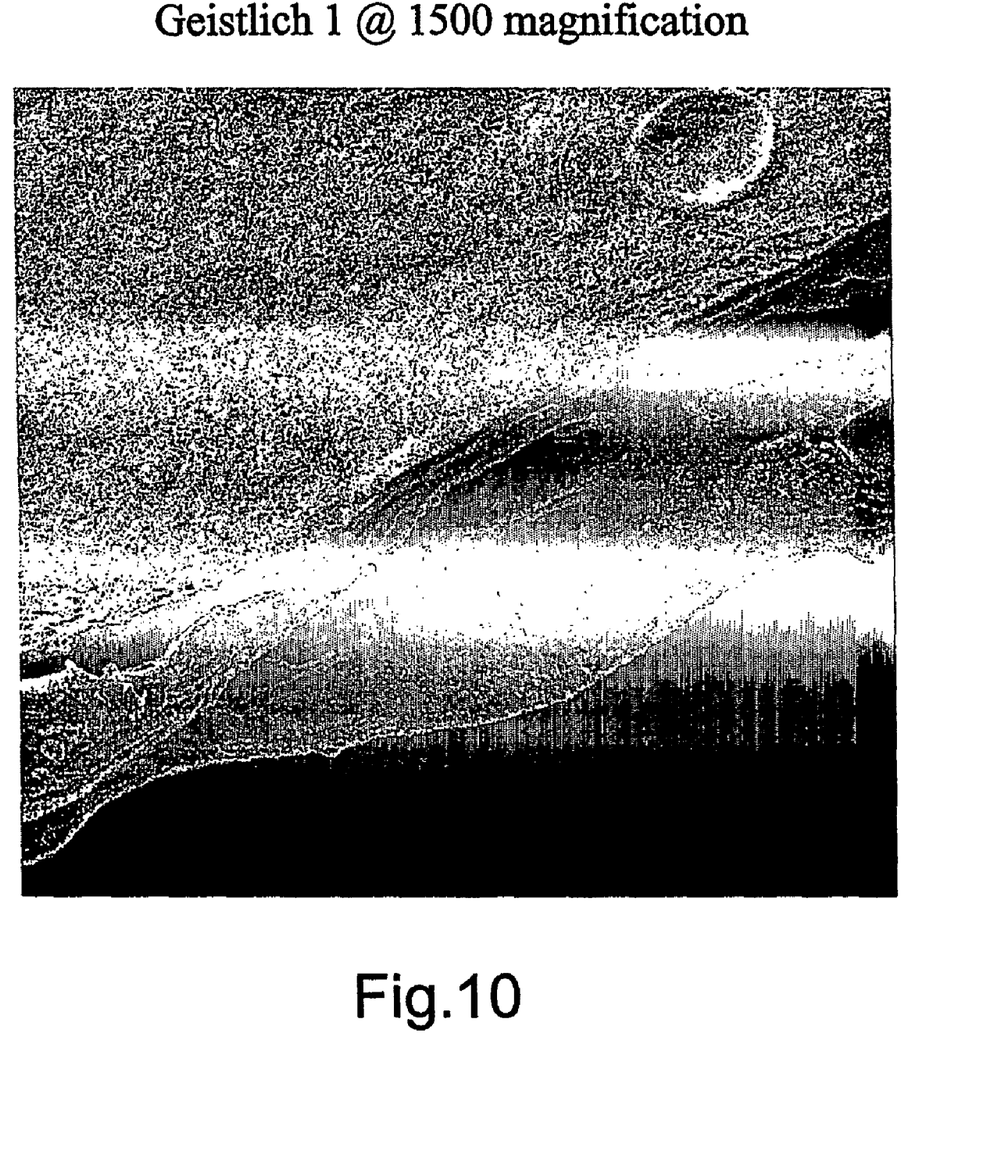
Figure 11:
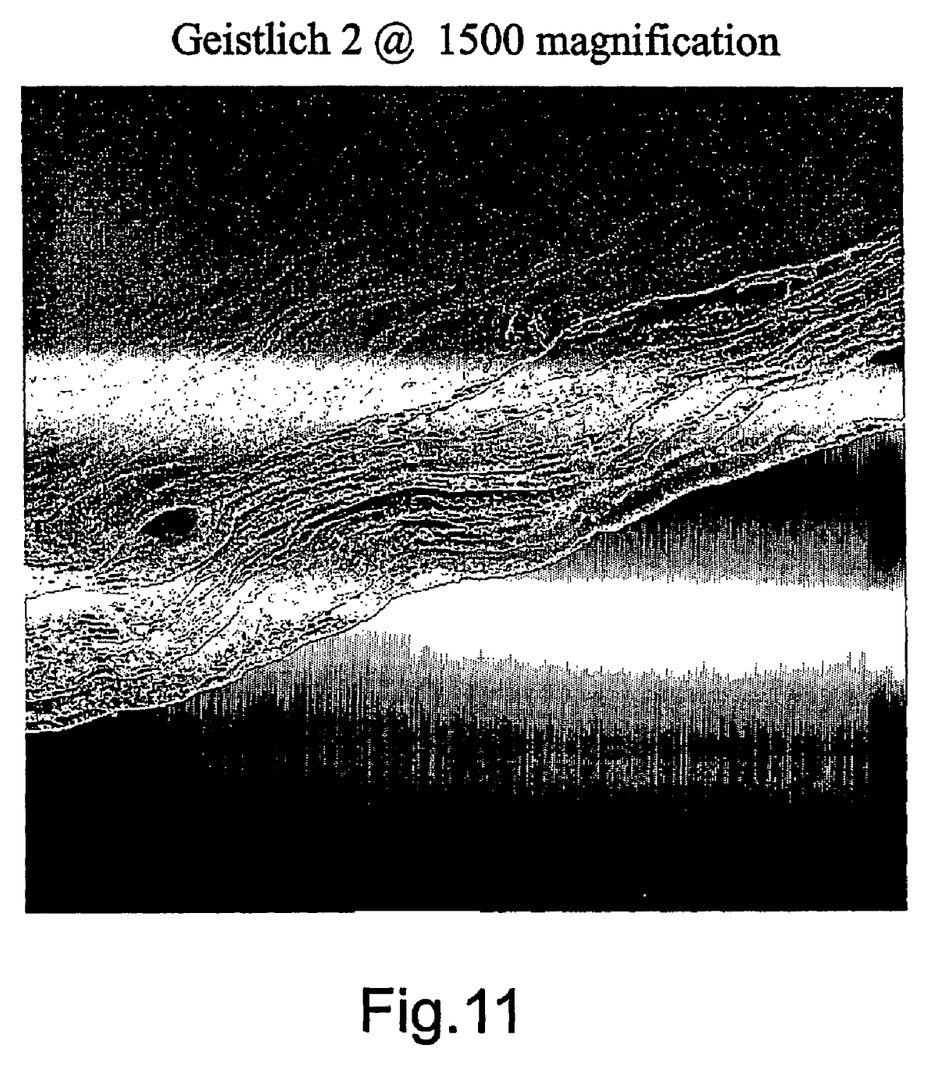

| IST Chart Notes | | |
|---|---|---|
| Attribute | Devro films | Commercial porcine films |
| Md Shrinkage onset temperature | >52° C. | <50° C. |
| Md Peak Shrinkage force | >90 g | <80 g |
| Md temperature at peak shrinkage force | >75° C. | <68° C. |
| Td Shrinkage onset temperature | >52° C. | <50° C. |
| Td Peak Shrinkage force | >50 g | <65 g |
| Td temperature at peak shrinkage force | >72° C. | <66° C. |

In all cases the charts highlight that the Devro films have higher shrinkage onset temperatures, typically higher than 52° C. For Geistlich films this value is below 50° C.

The Devro films, in general, have considerably higher shrinkage tensions and the temperature of maximum shrinkage is also considerably higher.

This indicates the presence of a more thermally stable collagen.

Differential Scanning Calorimetry

DSC was carried out on the films by conventional techniques. The results for the films are given in the Table 2 below.

TABLE 2

| Ref no | Ts (peak) - ° C. | Ts (onset) - ° C. | Energy (J/g of dry material) | % collagen | Energy (J/g of collagen) | Average |
|---|---|---|---|---|---|---|
| Geistlich 1 | 49.0 | 34.9 | 19.31 | 62.8649 | 30.7167 | |
| Geistlich 1 | 48.3 | 35.1 | 19.61 | 63.2973 | 30.9808 | 30.8487 |
| Ex 1b | 66.2 | 47.8 | 44.73 | 61.7 | 72.5142 | |
| Ex 1b | 66.4 | 47.7 | 43.34 | 61.7 | 70.2608 | 71.3875 |
| Ex 2b | 65.3 | 54.2 | 28.00 | 58.3 | 48.0337 | |
| Ex 2b | 67.8 | 53.9 | 30.37 | 58.3 | 52.0995 | 50.0666 |
| Ex 2a | 61.7 | 49.6 | 25.72 | 59.5 | 43.2539 | |
| Ex 2a | 50.7 | 40.0 | 25.57 | 59.5 | 43.0017 | 43.1278 |

EXAMPLE 4

Final Product Manufacture i) A mixture of the following is prepared and tumbled:

| Pork Shoulder pieces | 55 Kg |
|---|---|
| Nitrite Salt | 1.65 Kg |
| Polyphosphate | 0.25 Kg |
| Ascorbate | 0.08 Kg |
| Dextrose | 0.58 Kg |
| Water | 24.9 Kg | ii) 1 kg nominal weight hams are produced by applying elastic netting together with the collagen film of Examples 1a, 1b, 2a and 2b above using a proprietary ham production device such as those made by Possenti. The ends are clipped and the uncooked product is placed on a cooking rack. Air bubbles are allowed to escape by puncturing the film at appropriate places.

iii) The hams are cooked via a conventional process such as:

| Cook | no smoke | 20 minutes | 122 deg F. Dry bulb | 100% RH |
|---|---|---|---|---|
| Cook | no smoke | 30 minutes | 131 deg F. Dry bulb | 15% RH |
| Cook | smoke | 30 minutes | 140 deg F. Dry bulb | 64% RH |
| Cook | no smoke | 20 minutes | 140 deg F. Dry bulb | 15% RH |
| Cook | smoke | 30 minutes | 149 deg F. Dry bulb | 64% RH |
| Cook | no smoke | 20 minutes | 149 deg F. Dry bulb | 15% RH |
| Cook | smoke | 30 minutes | 154 deg F. Dry bulb | 65% RH |
| Cook | no smoke | 20 minutes | 172 deg F. Dry bulb | 100% RH |
| Cold Water Shower | | 20 minutes | | |

The final product properties are set out in Table 3.

TABLE 3

| | Stuffing/Clipping | Cooking | Appearance | Film Integrity |
|---|---|---|---|---|
| Ex 1a | Good | Good | Good | Good |
| Ex 1b | Good | Good | Good | Good |
| Ex 2a | Good | Good | Good | Good |
| Ex 2b | Good | Good | Good | Good |
| Geistlich 1 | Good | Good | Good | Good |
| Geistlich 2 | Good | Good | Good | Good |

The invention claimed is:

1. An extruded collagen film, made from an extrudable gel, wherein said film has:
   a collagen content that consists essentially of porcine collagen, wherein said porcine collagen consists essentially of sow collagen;
   a fat content below 20% on a dry weight basis of the film; and
   a ratio by weight of collagen to fat in the film of at least 2.5 to 1,
   wherein any collagen derived from sheep, poultry, birds and/or fish in said film is present in an amount of less than 10% by weight of the total collagen content in said film, and any non-sow porcine collagen in said film is collagen derived from young pigs and is present in an amount of less than 10% by weight of the total porcine collagen in said film, and wherein said film has an extrusion direction wet tear strength of greater than 300 gf/mm.

2. The film according to claim 1 wherein the fat content is below 18% by weight on a dry weight basis of the film.

3. The film according to claim 1 wherein the ratio by weight of collagen to fat in the film is at least 4:1.

4. The film according to claim 3 wherein the ratio by weight of collagen to fat in the film is above 10:1.

5. The film according to claim 4 wherein ratio by weight of collagen to fat in the film is in the range 25:1 to 50:1.

6. The film according to claim 1, wherein any collagen derived from sheep, poultry, birds and/or fish in said film is present in an amount less than 5% by weight of the total collagen in the film.

7. The film according to claim 1, which further comprises an alginate glycol in the extrudable gel.

8. The film according to claim 7, wherein the alginate glycol is present in the extrudable gel in an amount of up to 0.5% by weight.

9. The film according to claim 7, wherein the alginate glycol is present in the extrudable gel at a collagen to alginate glycol ratio in the range 95:5 to 75:25 by weight.

10. The film according to claim 1, wherein said film further comprises a humectant.

11. The film according to claim 10, wherein the humectant is present in said film in an amount of 15 to 45% on a dry weight basis.

12. The film according to claim 1, wherein the extrudable gel further comprises a coagulating agent.

13. The film according to claim 1 wherein the extrudable gel comprises a collagen solids content in the range of 2 to 10%.

14. A string or netting formed from the film of claim 1.

15. A method of producing the extruded collagen film of claim 1, wherein the collagen content of the film consists essentially of sow collagen, and the method comprises the steps of:

producing defatted sow skins;

forming the sow skins into an extrudable gel; and extruding the gel and forming a film.

16. The method according to claim 15 wherein the sow skins are defatted by mechanical defleshing.

17. A food product wrapped with the extruded collagen film of claim 1.

* * * * *